US012809082B2

(12) United States Patent
Sato et al.

(10) Patent No.: US 12,809,082 B2
(45) Date of Patent: Nov. 24, 2026

(54) OPTICAL FIBER

(71) Applicant: SUMITOMO ELECTRIC INDUSTRIES, LTD., Osaka (JP)

(72) Inventors: Shin Sato, Osaka (JP); Takemi Hasegawa, Osaka (JP); Yuki Kawaguchi, Osaka (JP); Hirotaka Sakuma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 263 days.

(21) Appl. No.: 18/697,045

(22) PCT Filed: Sep. 12, 2022

(86) PCT No.: PCT/JP2022/034075
§ 371 (c)(1),
(2) Date: Mar. 29, 2024

(87) PCT Pub. No.: WO2023/062997
PCT Pub. Date: Apr. 20, 2023

(65) Prior Publication Data

US 2024/0402417 A1 Dec. 5, 2024

(30) Foreign Application Priority Data

Oct. 14, 2021 (JP) ................................ 2021-168535

(51) Int. Cl.
*G02B 6/02* (2006.01)

(52) U.S. Cl.
CPC ..... *G02B 6/02333* (2013.01); *G02B 6/02342* (2013.01)

(58) Field of Classification Search
None
See application file for complete search history.

(56) References Cited

U.S. PATENT DOCUMENTS 6,289,161 B1 9/2001 Schotz et al.
2003/0086670 A1* 5/2003 Moridaira .......... G02B 6/03666 385/124
2005/0274151 A1 12/2005 Moridaira et al.
2012/0087625 A1* 4/2012 Han .................. C03B 37/01211 65/435
(Continued)

FOREIGN PATENT DOCUMENTS

CN 110794509 A 2/2020
JP 2005-537210 A 12/2005
(Continued)

OTHER PUBLICATIONS

International Search Report issued in Patent Application No. PCT/JP2022/034075 dated Nov. 22, 2022.
(Continued)

*Primary Examiner* — Jerry Rahll
(74) *Attorney, Agent, or Firm* — McDonald Hopkins LLC

(57) ABSTRACT

An optical fiber includes: a core made of silica glass; and a cladding surrounding the core and made of silica glass. A spectrum of a wavenumber derivative dR(k)/dk of a Raman scattering spectrum R(k) obtained by irradiating the core with pump light having a wavelength 532 nm passes through 0 twice or less in a range of wavenumber from 400 $cm^{-1}$ to 550 $cm^{-1}$.

15 Claims, 11 Drawing Sheets

(56) References Cited

U.S. PATENT DOCUMENTS

| | | | | |
|---|---|---|---|---|
| 2016/0152504 | A1* | 6/2016 | Ono | C03B 37/02727 65/117 |
| 2017/0305781 | A1 | 10/2017 | Haruna et al. | |
| 2017/0371096 | A1* | 12/2017 | Sakuma | C03B 37/01453 |
| 2018/0362392 | A1* | 12/2018 | Sakuma | C03B 37/01869 |
| 2019/0324195 | A1 | 10/2019 | Sakuma et al. | |
| 2020/0249393 | A1 | 8/2020 | Sakuma et al. | |

FOREIGN PATENT DOCUMENTS

| | | | |
|---|---|---|---|
| JP | 2006-335638 | A | 12/2006 |
| JP | 2016-130786 | A | 7/2016 |
| JP | 2018-532674 | A | 11/2018 |
| JP | 2019-191297 | A | 10/2019 |
| WO | 2004/020357 | A2 | 3/2004 |
| WO | 2017/044543 | A1 | 3/2017 |

OTHER PUBLICATIONS

A. E. Geissberger et al., "Raman studies of vitreous Si02 versus fictive temperature", Physical Review B, vol. 28, No. 6, Sep. 15, 1983, pp. 3266-3271.

* cited by examiner

OPTICAL FIBER

TECHNICAL FIELD

The present disclosure relates to an optical fiber. The present application claims priority to Japanese Patent Application No. 2021-168535 filed on Oct. 14, 2021, the content of which is incorporated herein by reference in its entirety.

BACKGROUND ART

The transmission loss of the optical fiber in a near-infrared region used as a communication wavelength band is greatly affected by Rayleigh scattering. Therefore, reduction of the transmission loss requires reduction of the Rayleigh scattering. The Rayleigh scattering occurs by reflecting non-uniformity of the glass structure. The non-uniformity of the glass structure is reduced by promoting structural relaxation from a glass state to a crystal state having a periodic uniform structure.

Patent Literature 1 discloses a method in which an alkali metal is added to a core portion of the optical fiber preform to increase fluidity of the core portion during drawing of the optical fiber and promote structural relaxation even at a lower temperature. Patent Literature 1 discloses a method of controlling an annealing time during drawing of the optical fiber by installation of an annealing furnace to promote structural relaxation.

CITATION LIST

Patent Literature

[Patent Literature 1] Japanese Unexamined Patent Application Publication No. 2005-537210

[Patent Literature 2] Japanese Translation of PCT International Application Publication No. 2016-130786

Non-Patent Literature

[Non-Patent Literature 1] A. E. Geissberger et al., "Raman studies of vitreous $SiO_2$ versus fictive temperature", Phys. Rev. B, 28, 3266 (1983)

SUMMARY OF INVENTION

An optical fiber according to a first aspect of the present disclosure includes: a core made of silica glass; and a cladding surrounding the core and made of silica glass, wherein a spectrum of a wavenumber derivative dR(k)/dk of a Raman scattering spectrum R(k) obtained by irradiating the core with pump light having a wavelength 532 nm passes through 0 twice or less in a range of wavenumber from 400 $cm^{-1}$ to 550 $cm^{-1}$.

An optical fiber according to a second aspect of the present disclosure includes: a core made of silica glass; and a cladding surrounding the core and made of silica glass, wherein in a Raman scattering spectrum R(k) obtained by irradiating the core with pump light of wavelength 532 nm, a ratio $P_{D1}/P_{\omega3}$ of a maximum value $P_{D1}$ of intensity of a Raman scattering light D1 caused by a four membered ring structure to a maximum value $P_{\omega3}$ of intensity of a Raman scattering light ω3 caused by one of vibration modes of Si—O vibration of a $SiO_4$ structure is 5 or more.

DESCRIPTION OF EMBODIMENTS

Problems to be Solved by Invention

Figure 1:
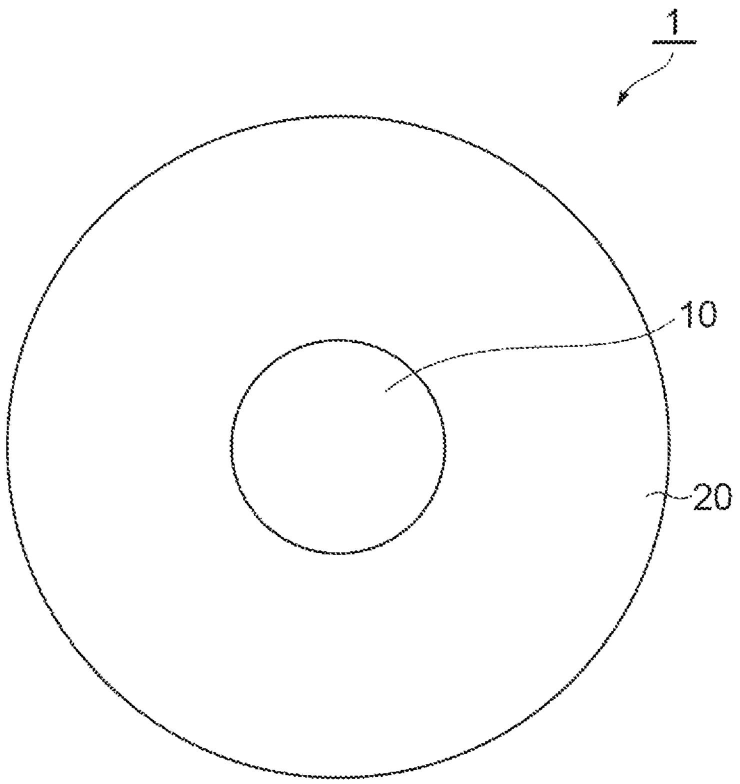
FIG. 1 is a cross-sectional view of an optical fiber according to an embodiment.

The silica glass is glass mainly composed of $SiO_2$. In the silica glass, $SiO_2$ melted at a high temperature is rapidly cooled to freeze a liquid random structure at a high temperature. Therefore, silica glass has not only a six membered ring structure of quartz which is a crystal of $SiO_2$, but also three membered ring and four membered ring Si—O bonding structures in which the six membered ring structure is collapsed. As a result, non-uniformity occurs in the glass structure and the Rayleigh scattering increases.

In the background art as described in Patent Literature 1, reduction of three membered ring structure and four membered ring structure of glass is mainly performed in order to reduce the non-uniformity of glass structure. However, there is a limit in suppressing the Rayleigh scattering by reducing the three membered ring structure and the four membered ring structure of glass from the viewpoint of compatibility with productivity. For example, in the method of reducing the viscosity by the additive element, $SiO_2$ is easily transferred to the crystal state by the additive element. As a result, crystallization using the compound of the additive element as a crystal nucleus easily occurs, and the yield decreases. Further, the slow cooling time at the time of drawing the optical fiber becomes longer by lowering the drawing speed, but the productivity is lowered.

The purpose of the present disclosure is to provide an optical fiber having high productivity and low transmission loss.

Effects of Present Disclosure

According to the present disclosure, an optical fiber having high productivity and low transmission loss can be provided.

Description of Embodiments of Present Disclosure

Embodiments of the present disclosure will first be listed and described. An optical fiber according to a first aspect of the present disclosure includes: a core made of silica glass; and a cladding surrounding the core and made of silica glass, wherein a spectrum of a wavenumber derivative dR(k)/dk of a Raman scattering spectrum R(k) obtained by irradiating the core with pump light having a wavelength 532 nm passes through 0 twice or less in a range of wavenumber from 400 $cm^{-1}$ to 550 $cm^{-1}$.

In the optical fiber according to the first aspect of the present disclosure, the fluctuation of the glass structure is suppressed by increasing the ratio of the four membered ring structure in the glass. Thus, the Rayleigh scattering is reduced. As a result, transmission loss may be reduced without reducing productivity.

An optical fiber according to a second aspect of the present disclosure includes: a core made of silica glass; and a cladding surrounding the core and made of silica glass, wherein in a Raman scattering spectrum R(k) obtained by irradiating the core with pump light of wavelength 532 nm, a ratio $P_{D1}/P_{\omega3}$ of a maximum value $P_{D1}$ of intensity of a Raman scattering light D1 caused by a four membered ring structure to a maximum value $P_{\omega3}$ of intensity of a Raman scattering light ω3 caused by one of vibration modes of Si—O vibration of a $SiO_4$ structure is 5 or more.

In the optical fiber according to the second aspect of the present disclosure, the fluctuation of the glass structure is suppressed by increasing the ratio of the four membered ring structure in the glass. Thus, the Rayleigh scattering is reduced. As a result, transmission loss may be reduced without reducing productivity.

In the optical fiber according to the second aspect of the present disclosure, a spectrum of a wavenumber derivative dR(k)/dk of the Raman scattering spectrum R(k) may pass through 0 twice or less in a range of wavenumber from 400 $cm^{-1}$ to 550 $cm^{-1}$. In this case, transmission loss may be further reduced.

Details of Embodiments of Present Disclosure

A specific example of optical fiber in the present disclosure will be described below with reference to drawing. It should be noted that the present invention is not limited to these examples, but is defined by the scope of claims and is intended to include all modifications within the meaning and scope equivalent to the scope of claims. In the description of drawing, the same elements are denoted by the same reference numerals, and overlapping descriptions are omitted.

FIG. 1 is a cross-sectional view of an optical fiber according to an embodiment. In an optical fiber 1 according to the embodiment illustrated in FIG. 1, unlike the background art, a four membered ring structure is increased to reduce the Rayleigh scattering and reduce the transmission loss as a result thereof. Optical fiber 1 according to the embodiment includes a core 10 and a cladding 20. The diameter of core 10 is, for example, 6 μm or more and 20 μm or less. Cladding 20 surrounds core 10 and is in contact with the outer peripheral surface of core 10. The diameter of cladding 20 is, for example, 80 μm or more and 130 μm or less. The refractive index of cladding 20 is lower than that of core 10.

Core 10 is made of silica glass and includes, for example, an alkali metal element such as Li, Na, and K and a halogen element. Core 10 may further include another element. Cladding 20 is made of silica glass and includes, for example, a halogen element. Cladding 20 may further include another element.

All additive elements added to core 10 and cladding 20 have the effect of reducing the viscosity of $SiO_2$ glass. Therefore, if the additive concentration (mass fraction) is too high, the promotion of the four membered ring structure is suppressed during the application of high voltage and the drawing process in the manufacturing phase. The additive concentration may be 10000 ppm or less. On the other hand, when the viscosity increases, there is concern about an increase in transmission loss due to the occurrence of defects such as NBOHC (non-bridging oxygen hole center) during drawing. Thus, a modifying element may be added to core 10 and cladding 20. The modifying element is an element that can modify and repair defect portions such as NBOHC. The modifying element includes, for example, halogen elements such as fluorine and chlorine. Both core 10 and cladding 20 may include at least one type of halogen element in a mass fraction of 100 ppm or more, and may include two or more types of halogen elements.

In optical fiber 1 according to the embodiment, a spectrum of a wavenumber derivative dR(k)/dk of a Raman scattering spectrum R(k) obtained by irradiating the core 10 with pump light having a wavelength 532 nm passes through 0 twice or less in a range of wavenumber from 400 $cm^{-1}$ to 550 $cm^{-1}$. In addition, in the Raman scattering spectrum R(k), a ratio $P_{D1}/P_{\omega3}$ of a maximum value $P_{D1}$ of intensity of a Raman scattering light D1 caused by the four membered ring structure to a maximum value $P_{\omega3}$ of intensity of a Raman scattering light ω3 caused by one of vibration modes of Si—O vibration of a $SiO_4$ structure is 5 or more.

During preform manufacture of optical fiber 1 according to the embodiment, high-pressure processing may be performed to facilitate generation of the four membered ring structure. Since a pressure is applied to the glass in the high-pressure processing, the promotion of a three membered ring structure or the four membered ring structure, which have smaller voids comparing to a six membered ring structure commonly found in an ordinary crystal, can be expected. By the high-pressure processing, a pressure which is, for example, $10^{-4}$ GPa or more and 10 GPa or less may be applied to the glass. As the high-pressure processing method, HIP (hot isostatic pressing) method may be used. The HIP method is a method of performing pressurization using gas as a high pressure applying medium. According to the HIP method, generation of defects due to contamination and pressure application unevenness may be suppressed as compared to a pressure application method in which a material having high hardness is directly pressed.

During drawing optical fiber 1 according to the embodiment, He atmosphere having a high thermal conductivity may be used in the furnaces and cooling units in order to promote the creation of four membered ring structures. Further, in order to rapidly cool optical fiber 1 after drawing, equipment for forcibly cooling optical fiber 1 after drawing may be used. The drawing speed is, for example, 500 m/min or more. This facilitates the creation of additional four membered ring structure. The drawing speed may be 1000 m/min or more, and it may also be 2000 m/min or more.

Optical fiber 1 according to an example was manufactured as follows. First, a core portion including chlorine or fluorine in a mass fraction of 100 ppm or more and other additive elements was prepared. Subsequently, after preforming, a pressure greater than $10^{-4}$ GPa and equal to or less than 10 GPa was applied to the glass by using the HIP method. Subsequently, drawing was performed at the drawing speed of 500 m/min or more, and rapid cooling was performed in the He atmosphere.

The optical fiber according to a comparative example was manufactured in the same manner as optical fiber 1 according to the example, except that none of the techniques described above for facilitating the generation of the four membered ring structure was employed. That is, in the manufacturing method of the optical fiber according to the comparative example, the high-pressure processing was not performed. In addition, He atmosphere was not used in the furnace and the cooling unit. In addition, equipment for forcibly cooling the optical fiber after drawing was not used. In addition, drawing was performed at the drawing speed of less than 500 m/min. The manufacturing method of optical fiber according to the comparative example corresponds to the technique of the background art that reduces transmission loss by equally reducing the four membered ring structure and the three membered ring structure.

Here, the Raman scattering spectrum will be described. In general, when a material is irradiated with light, Raman scattering light having a wavelength different from that of irradiation light is generated due to interaction between the light and the material (molecular vibration). The structure of the molecular level of the substance can be analyzed by a Raman scattering spectrum obtained by dispersing the Raman scattering light. In the Raman scattering spectrum, a plurality of peaks occurs according to the number of vibration modes of atom coupling in the substance. For glass that does not have a long-range ordered structure, the Raman scattering spectrum is one of a few techniques for confirming the presence ratio of three membered ring structures and four membered ring structures in the glass structure.

The Raman scattering spectrum of optical fiber 1 is measured, for example, using microscopic Raman spectroscopy similar to that in Patent Literature 2. That is, the laser light of the wavelength 532 nm output from the semiconductor laser device is condensed to have a spot diameter of about 2 μm and is irradiated to an end face of the optical fiber. Exposure is performed twice for 30 seconds in total. The intensity of the laser light is an oscillation output 1 W (about 100 mW in the end face of the optical fiber). Then, the laser light is vertically irradiated to the end face of the optical fiber to measure the Raman scattering spectrum by backscattering geometry.

Figure 2:
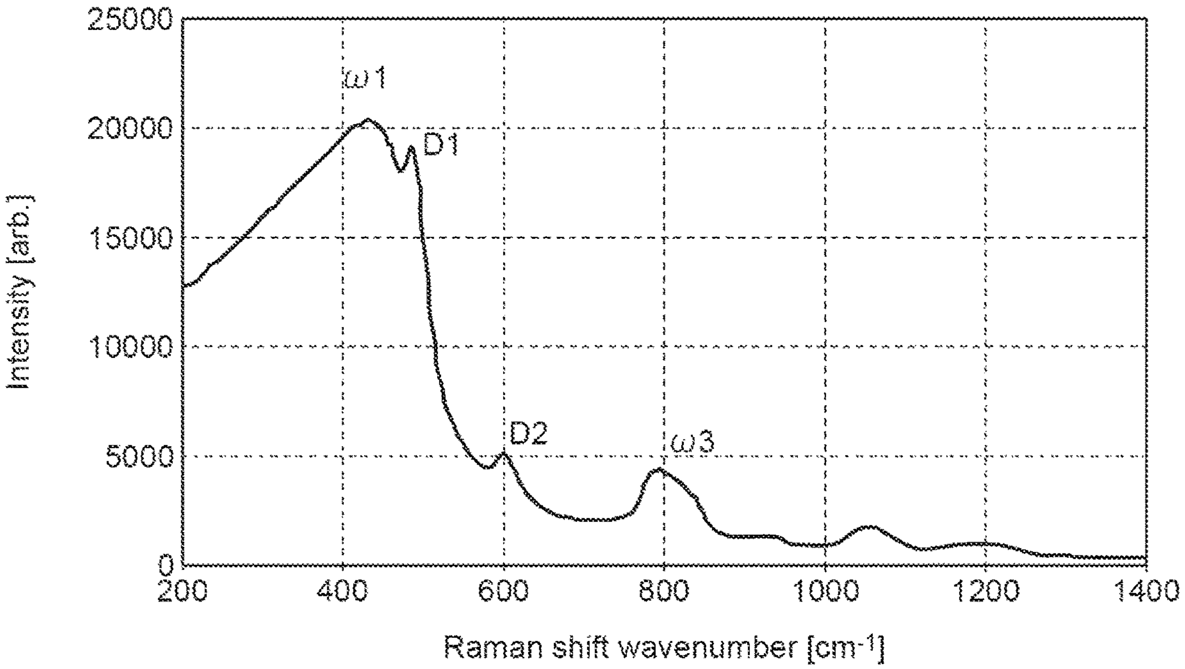
FIG. 2 is a diagram showing an example of a Raman scattering spectrum obtained by irradiating a silica-based glass with laser light having a wavelength 532 nm.

FIG. 2 is a diagram showing an example of a Raman scattering spectrum obtained by irradiating a silica-based glass with laser light having a wavelength 532 nm. In FIG. 2, the horizontal axis indicates the Raman shift wavenumber ($cm^{-1}$), and the vertical axis indicates the intensity. In the Raman scattering spectrum shown in FIG. 2, a peak of a Raman scattering light ω1 caused by one of vibration modes of Si—O stretching vibration of silica six membered ring structure is observed in a range of the wavenumber from 400 $cm^{-1}$ to 470 $cm^{-1}$. A peak of Raman scattering light D1 caused by silica four membered ring structure is observed in the range of the wavenumber from 480 $cm^{-1}$ to 520 $cm^{-1}$. A peak of a Raman scattering light D2 caused by silica three membered ring structure is observed in a range of the wavenumber from 565 $cm^{-1}$ to 640 $cm^{-1}$. A peak of Raman scattering light ω3 caused by one of vibration modes of Si—O stretching vibration of silica six membered ring structure is observed in a range of the wavenumber from 750 $cm^{-1}$ to 875 $cm^{-1}$. The stretching vibration of Si—O has Raman shift wavenumbers which vary according to its vibration modes, and the Raman scattering lights ω1 and ω3 are caused by different vibration modes (Non-Patent Literature 1).

Figure 3:
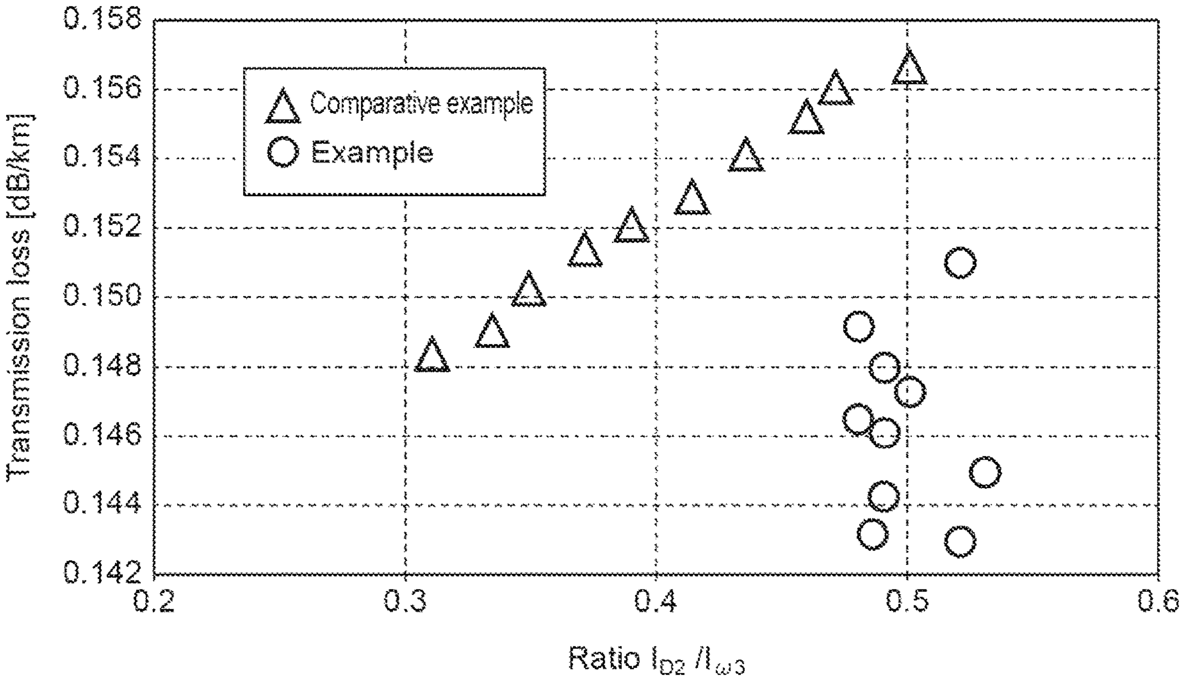
FIG. 3 is a graph showing the relationship between a ratio $I_{D2}/I_{\omega3}$ and transmission loss.

First, the optical fibers according to the example and the comparative example were used to compare the relationship between a ratio $I_{D2}/I_{\omega3}$ and transmission loss reported in Patent Literature 2. FIG. 3 is a graph showing the relationship between a ratio $I_{D2}/I_{\omega3}$ and transmission loss. In FIG. 3, the horizontal axis indicates the ratio $I_{D2}/I_{\omega3}$, and the vertical axis indicates transmission loss (dB/km). The ratio $I_{D2}/I_{\omega3}$ is a ratio of an area intensity $I_{D2}$ of the Raman scattering light D2 to an area intensity $I_{\omega3}$ of the Raman scattering light ω3.

The area intensity $I_{D2}$ is represented by an area of a region sandwiched between a baseline drawn in the range of the wavenumber from 565 $cm^{-1}$ to 640 $cm^{-1}$ in the Raman scattering spectrum and the Raman scattering spectrum. The area intensity $I_{\omega3}$ is represented by an area of a region sandwiched between a baseline drawn in the range of the wavenumber from 750 $cm^{-1}$ to 875 $cm^{-1}$ in the Raman scattering spectrum and the Raman scattering spectrum.

In the optical fiber according to the comparative example, the four membered ring structure and the three membered ring structure are equally reduced. The transmission loss of the optical fiber according to the comparative example decreases as the ratio $I_{D2}/I_{\omega3}$ decreases. On the other hand, in the optical fiber according to the example, since only the four membered ring structure is increased, the presence ratio of the three membered ring structure and the six membered ring structure in the glass structure decreases at the same degree. Therefore, the transmission loss of the optical fiber according to the example varies even if the ratio $I_{D2}/I_{\omega3}$ is substantially constant. Therefore, the reduction effect of transmission loss of the optical fiber according to the example cannot be explained by the ratio $I_{D2}/I_{\omega3}$.

Figure 4:
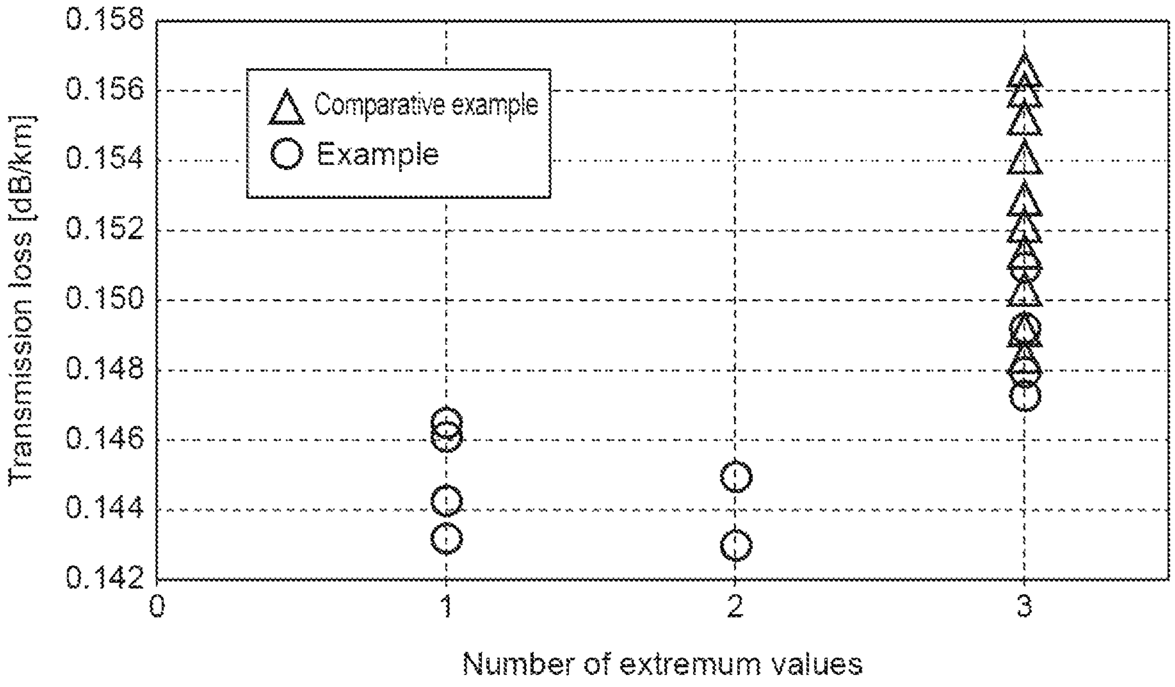
FIG. 4 is a graph showing a relationship between the number of extremum values included in a range of wavenumber from 400 $cm^{-1}$ to 550 $cm^{-1}$ of a Raman scattering spectrum and transmission loss.

With reference to FIGS. 4 to 9, variations in transmission loss in a region where the ratio $I_{D2}/I_{\omega3}$ in FIG. 3 is large will be described. FIG. 4 is a graph showing a relationship between the number of extremum values included in a range of wavenumber from 400 $cm^{-1}$ to 550 $cm^{-1}$ of a Raman scattering spectrum and transmission loss. In FIG. 4, the horizontal axis indicates the number of extremum values, and the vertical axis indicates transmission loss (dB/km). The extremum value is a point that satisfies the wavenumber derivative dR(k)/dk=0 in the Raman scattering spectrum R(k). The number of extremum values is equal to the number of times the spectrum of the wavenumber derivative dR(k)/dk passes through 0 in the range of wavenumber 400 $cm^{-1}$ or more and 550 $cm^{-1}$ or less. In actual measurement, the number of measurement points is finite. Therefore, in the continuous measured wavenumber points $k_i$ and $k_{i+1}$, when the following expression is satisfied, it is considered that an extremum value exists between the wavenumber k; and the wavenumber $k_{i+1}$.

$$dR(k_i)/dk \times dR(k_{i+1})/dk < 0$$

In the above-mentioned the wavenumber range, if the measured noise is small enough to be ignored, the number of the extremum values should be within three. Since the measured Raman scattering spectrum includes measured noise, the extremum values exceeding three points may exist due to the noise. In this case, the moving average may be performed in the wavenumber range in which the number of the extremum values is three or less. The wavenumber range in which the moving average is performed may be, for example, a range of a wavenumber k≤10 $cm^{-1}$.

From the relationship shown in FIG. 4, it can be confirmed that the smaller the number of extremum values, the more effectively the transmission loss is reduced. In particular, when the number of extremum values is two or less, a transmission loss of 0.147 dB/km or less is realized.

Figure 5:
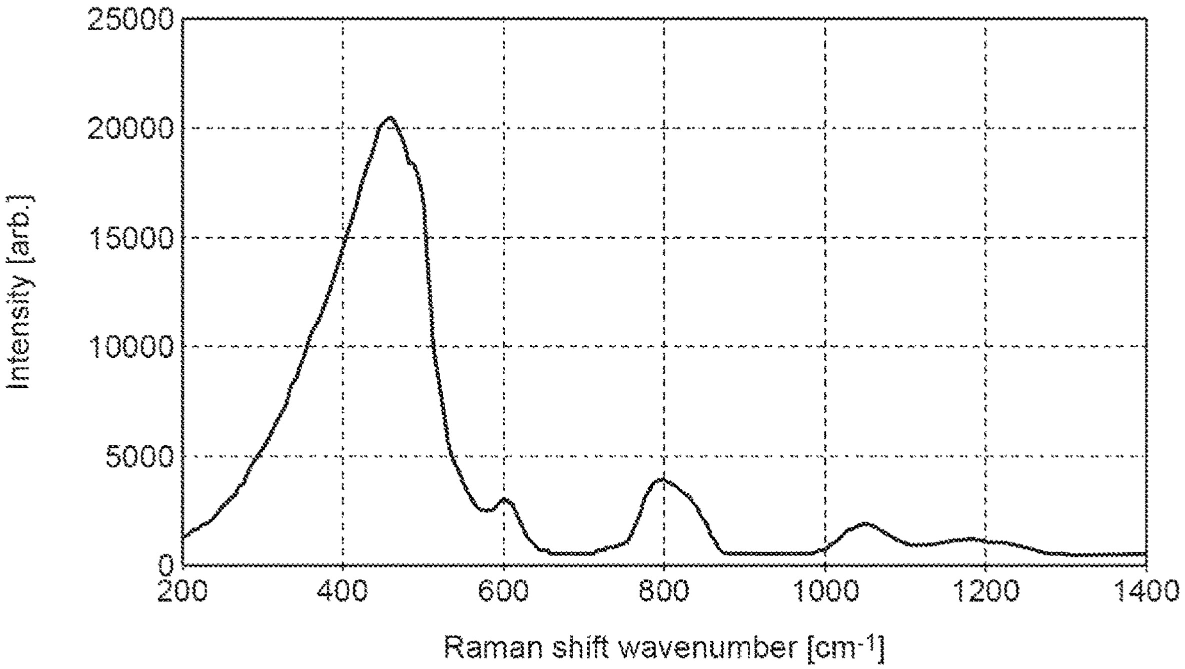
FIG. 5 is a diagram showing an example of a Raman scattering spectrum when the number of extremum values is two.
Figure 6:
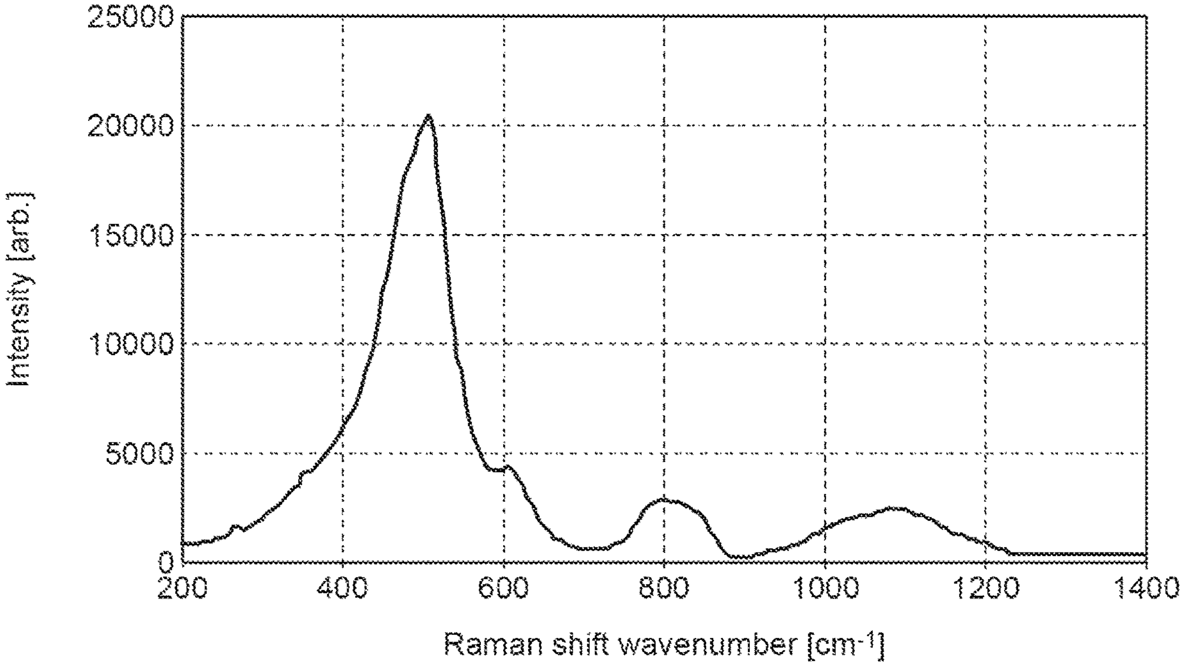
FIG. 6 is a diagram showing an example of a Raman scattering spectrum when the number of extremum values is one.

FIG. 5 is a diagram showing an example of a Raman scattering spectrum when the number of extremum values is two. FIG. 6 is a diagram showing an example of a Raman scattering spectrum when the number of extremum values is one. In FIGS. 5 and 6, the horizontal axis indicates the Raman shift wavenumber ($cm^{-1}$), and the vertical axis indicates the intensity.

The number of the extremum values defined above is an index indicating how many six membered ring structures and four membered ring structures coexist. In the conventional glass, six membered ring structures and four membered ring structures usually coexist, and the intensities of the peaks are approximately the same. Since there are two peaks in the above wavenumber range, the number of the extremum values is three in total, the extremum values including the local maximum value of the peak of the Raman scattering light ω1 caused by the six membered ring structure, the local maximum value of the peak of Raman scattering light D1 caused by the four membered ring structure, and the local minimum value located at the intersection of the skirts of these two peaks.

The state in which the number of the extremum values is two or less occurs because the peak of Raman scattering light D1 increases with respect to the peak of Raman scattering light ω1 as a result of the change from six membered ring structure to the four membered ring structure. That is, by unifying the glass structure into one type, the fluctuation of the glass structure (fluctuation of density) is suppressed and the Rayleigh scattering is reduced. Consequently, the state in which the number of the extremum values is two or less is obtained. The number of extremum values is an index indicating how much the glass structure is unified into the four membered ring structure. Therefore, the number of extremum values may be an important parameter affecting transmission loss.

Figure 7:
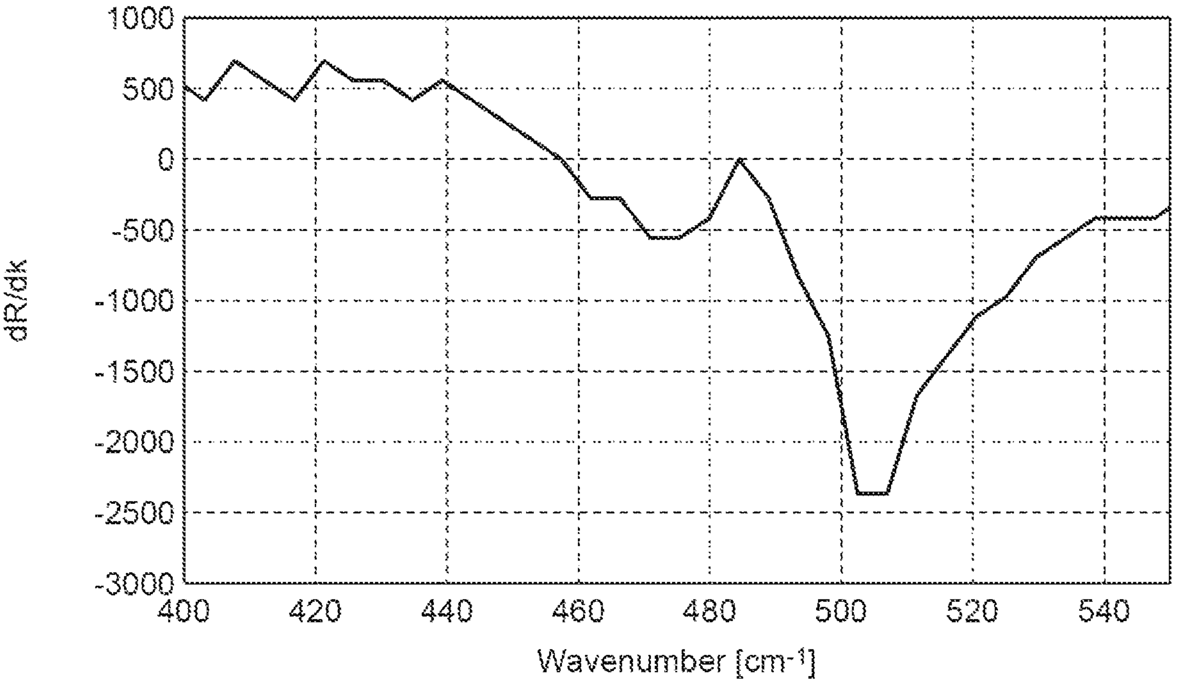
FIG. 7 is a diagram showing an example of the wavenumber derivative spectrum when the number of extremum values is two.
Figure 8:
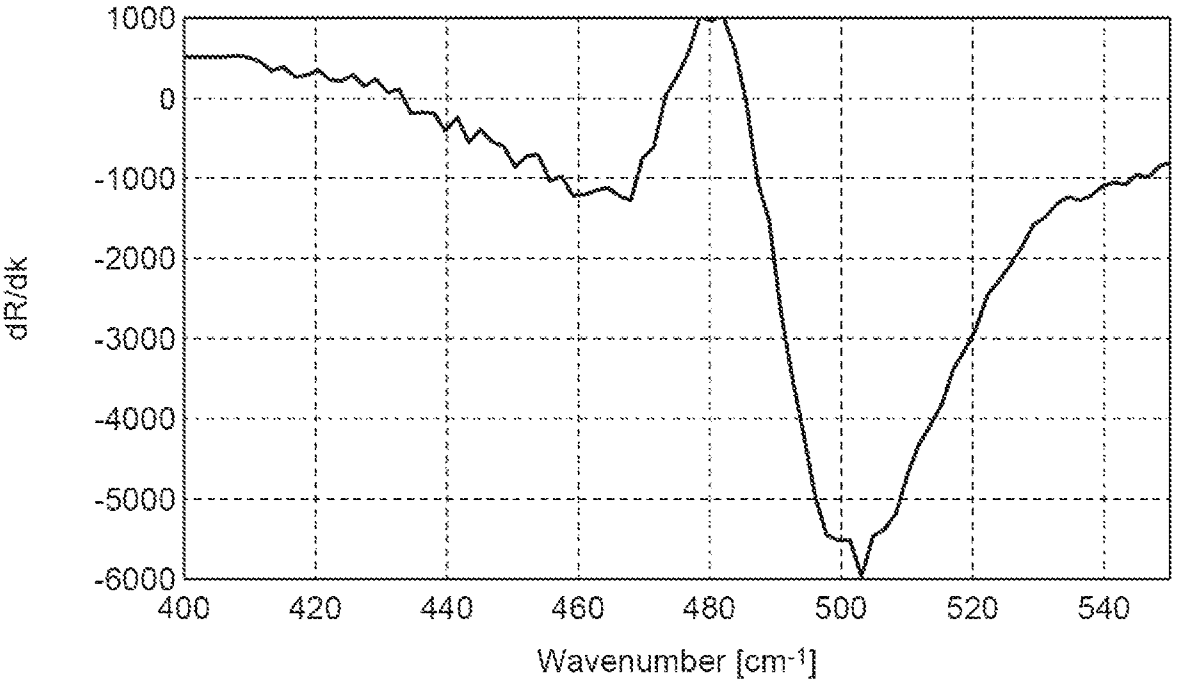
FIG. 8 is a diagram showing an example of the wavenumber derivative spectrum when the number of extremum values is three.

FIG. 7 is a diagram showing an example of the wavenumber derivative spectrum when the number of extremum values is two. The wavenumber derivative spectrum shown in FIG. 7 corresponds to the Raman scattering spectrum shown in FIG. 5. FIG. 8 is a diagram showing an example of the wavenumber derivative spectrum when the number of extremum values is three. In FIGS. 7 and 8, the horizontal axis indicates the wavenumber ($cm^{-1}$), and the vertical axis indicates the wavenumber derivative dR(k)/dk.

Figure 9:
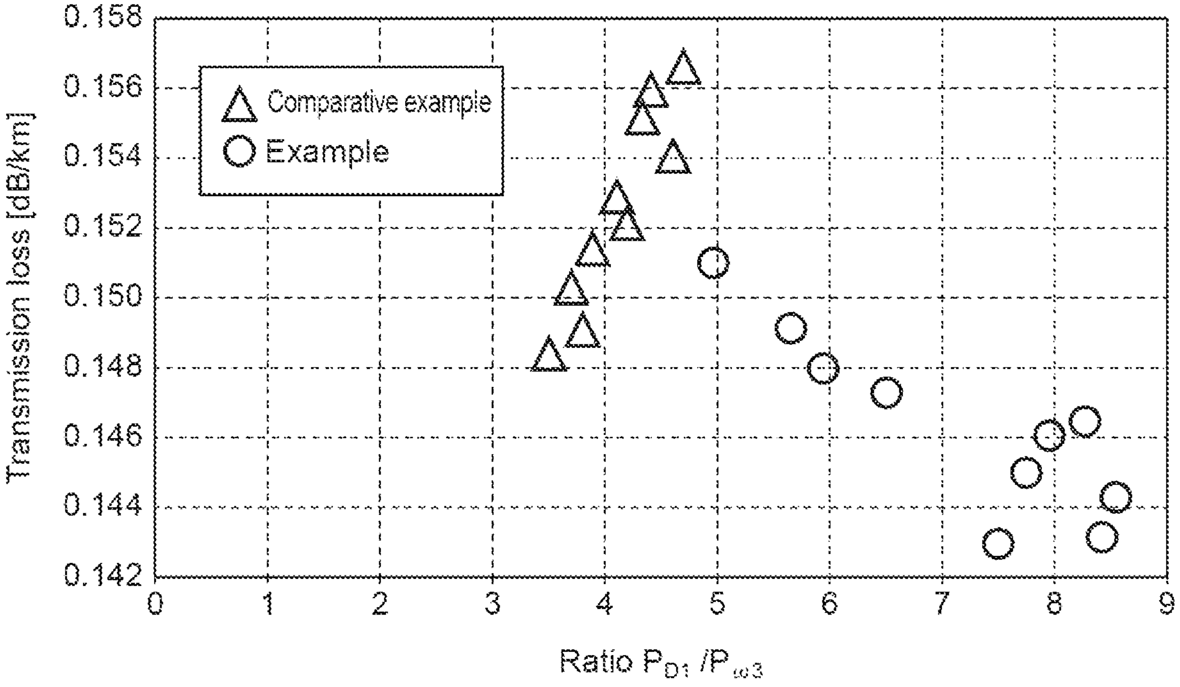
FIG. 9 is a graph showing the relationship between the ratio $P_{D1}/P_{\omega3}$ and transmission loss.

Subsequently, the relationship between the ratio $P_{D1}/P_{\omega3}$ of the maximum value of the core portion and the transmission loss was compared. FIG. 9 is a graph showing the relationship between the ratio $P_{D1}/P_{\omega3}$ and transmission loss. In FIG. 9, the horizontal axis indicates the ratio $P_{D1}/P_{\omega3}$, and the vertical axis indicates transmission loss (dB/km). The ratio $P_{D1}/P_{\omega3}$ is a ratio of the maximum value $P_{D1}$ of intensity of Raman scattering light D1 to the maximum value $P_{\omega3}$ of intensity of Raman scattering light ω3. The ratio $P_{D1}/P_{\omega3}$ indicates the ratio of four membered ring structure and six membered ring structure in glass.

As illustrated in FIG. 9, in the optical fiber according to the example, the transmission loss decreases as the ratio $P_{D1}/P_{\omega3}$ increases. When the ratio $P_{D1}/P_{\omega3}$ is 5 or more, a transmission loss of 0.152 dB/km or less is realized. When the ratio $P_{D1}/P_{\omega3}$ is 6 or more, transmission loss of 0.148 dB/km or less is realized. When the ratio $P_{D1}/P_{\omega3}$ is 7 or more, transmission loss of 0.147 dB/km or less is realized.

In the comparative example, a trend opposite to that of the embodiment is observed. That is, in the optical fiber according to the comparative example, the transmission loss increases as the ratio $P_{D1}/P_{\omega3}$ increases. As described above, the optical fiber according to the comparative example is manufactured by the technique of the background art that controls the fluctuation of the glass structure by reducing the three membered ring structure and the four membered ring structure. Actually, as the ratio $P_{D1}/P_{\omega3}$ decreases, the transmission loss of the optical fiber according to the comparative example decreases. According to the optical fiber according to the example, it is possible to control the fluctuation of the structure of the glass by increasing only the four membered ring structure so that the four membered ring structure occupies most of the glass structure. Actually, in the optical fiber according to the example, the ratio $P_{D1}/P_{\omega3}$ itself is increased as compared with the optical fiber according to the comparative example. The reason why the opposite tendency to the comparative example is observed in the example is presumed to be that only the four membered ring structure is increased.

Figure 10:
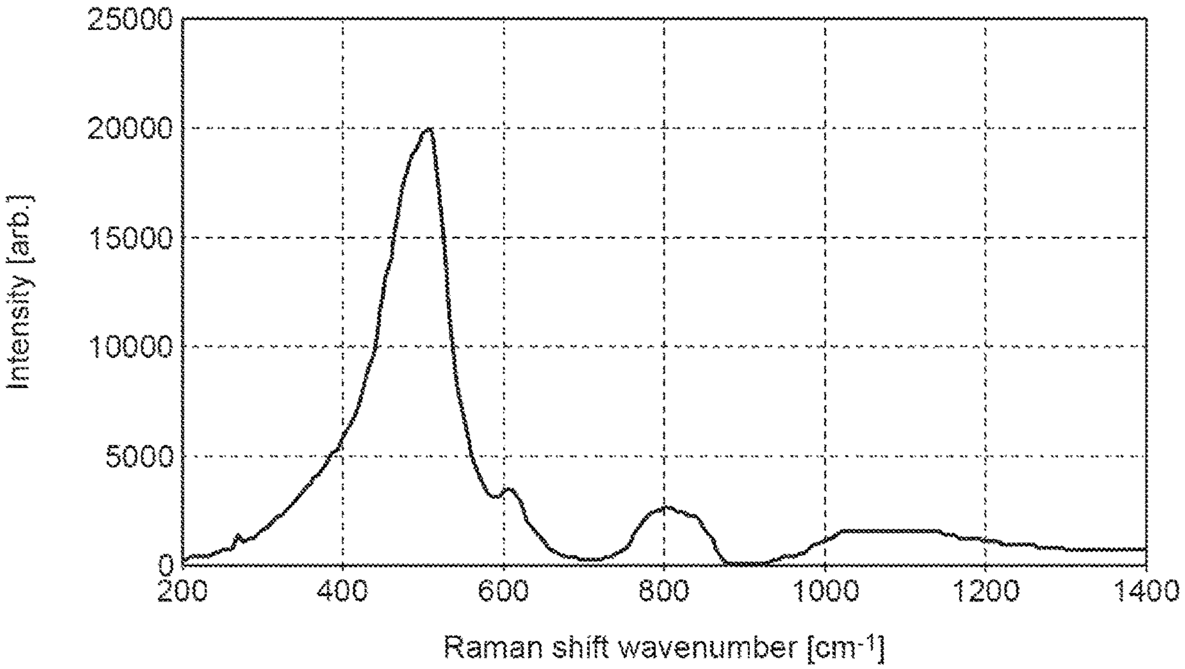
FIG. 10 is a diagram showing an example of a Raman scattering spectrum when the ratio $P_{D1}/P_{\omega3}$ is 5 or more.

FIG. 10 is a diagram showing an example of a Raman scattering spectrum when the ratio $P_{D1}/P_{\omega3}$ is 5 or more. As shown in FIG. 10, in this example, the number of the extremum values is one.

Figure 11:
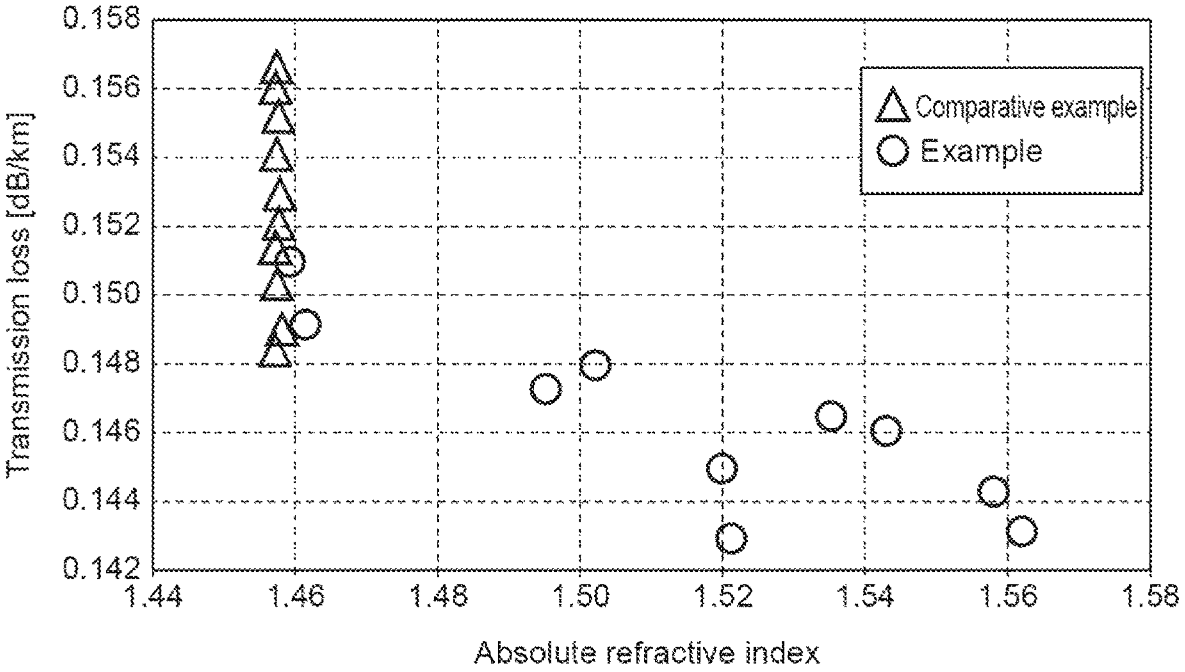
FIG. 11 is a graph showing the relationship between an absolute refractive index of a core and transmission loss.

FIG. 11 is a graph showing the relationship between an absolute refractive index of the core and transmission loss. In FIG. 11, a horizontal axis indicates an absolute refractive index of the core, and a vertical axis indicates transmission loss (dB/km). As shown in FIG. 11, the relationship between the absolute refractive index and the transmission loss is greatly different between the example and the comparative example. The optical fiber according to the example is more effective in reducing transmission loss. When the core's absolute refractive index n is $n \geq 1.46$, transmission loss of 0.150 dB/km or less is realized. When $n \geq 1.48$, transmission loss of 0.148 dB/km or less is realized. When $n \geq 1.52$, transmission loss of 0.147 dB/km or less is realized.

The voids contained in the four membered ring structure are smaller than those contained in the six membered ring structure based on the $SiO_4$ tetrahedral structure found in quartz crystal. Thus, as the four membered ring structure increases, the density per unit volume increases. Consequently, in the optical fiber according to the example, the absolute refractive index is increased when compared to the optical fiber according to the comparative example. That is, the increase or decrease in the refractive index reflects the increase or decrease in the four membered ring structure. Accordingly, the increase in the refractive index may be a parameter indicating the reduction of transmission loss caused by the increase in the four membered ring structure.

As the absolute refractive index of the core increases, the absolute refractive index of the cladding may also increase. In general, the larger the relative refractive index difference between the core and cladding, the easier it is to confine light. Therefore, the absolute refractive index of the cladding must be somewhat smaller than that of the core. In the present example, the absolute refractive index of the core can be increased. Therefore, even if the absolute refractive index of the cladding can be increased with respect to the comparative example which is the background art, the light confinement amount can be secured. For example, the absolute refractive index of the cladding may be greater than 1.42, greater than 1.44, greater than 1.46, or greater than 1.49.

REFERENCE SIGNS LIST

1 optical fiber
10 core
20 cladding

ω1 Raman scattering light caused by vibration mode of Si—O stretching vibration of silica six membered ring structure ω3 Raman scattering light caused by vibration mode of Si—O stretching vibration of silica six membered ring structure D1 Raman scattering light caused by silica four membered ring structure D2 Raman scattering light caused by silica three membered ring structure

What is claimed is:

1. An optical fiber comprising:

a core made of silica glass; and a cladding surrounding the core and made of silica glass, wherein in a Raman scattering spectrum R(k) obtained by irradiating the core with pump light of wavelength 532 nm, a ratio $P_{D1}/P_{\omega 3}$ of a maximum value $P_{D1}$ of intensity of a Raman scattering light D1 caused by a four membered ring structure to a maximum value $P_{\omega s}$ of intensity of a Raman scattering light ω3 caused by one of vibration modes of Si—O vibration of a $SiO_4$ structure is 5 or more.

2. The optical fiber according to claim 1, wherein a spectrum of a wavenumber derivative dR(k)/dk of the Raman scattering spectrum R(k) passes through 0 twice or less in a range of wavenumber from 400 $cm^{-1}$ to 550 $cm^{-1}$.

3. An optical fiber comprising:

a core made of silica glass; and a cladding surrounding the core and made of silica glass, wherein a spectrum of a wavenumber derivative dR(k)/dk of a Raman scattering spectrum R(k) obtained by irradiating the core with pump light having a wavelength 532 nm passes through 0 twice or less in a range of wavenumber from 400 $cm^{-1}$ to 550 $cm^{-1}$.

4. The optical fiber according to claim 1, wherein a concentration of additive element added to each of the core and the cladding is 10000 ppm or less.

5. The optical fiber according to claim 1, wherein each of the core and the cladding includes at least one kind of halogen element in a mass fraction of 100 ppm or more.

6. The optical fiber according to claim 1, wherein transmission loss is 0.152 dB/km or less.

7. The optical fiber according to claim 1, wherein transmission loss is 0.148 dB/km or less.

8. The optical fiber according to claim 1, wherein transmission loss is 0.147 dB/km or less.

9. The optical fiber according to claim 1, wherein an absolute refractive index of the core is 1.46 or more.

10. The optical fiber according to claim 1, wherein an absolute refractive index of the core is 1.48 or more.

11. The optical fiber according to claim 1, wherein an absolute refractive index of the core is 1.52 or more.

12. The optical fiber according to claim 1, wherein an absolute refractive index of the cladding is 1.42 or more.

13. The optical fiber according to claim 1, wherein an absolute refractive index of the cladding is 1.44 or more.

14. The optical fiber according to claim 1, wherein an absolute refractive index of the cladding is 1.46 or more.

15. The optical fiber according to claim 1, wherein an absolute refractive index of the cladding is 1.49 or more.

* * * * *